(12) United States Patent
Wright et al.

(10) Patent No.: US 7,505,566 B2
(45) Date of Patent: *Mar. 17, 2009

(54) METHOD, SYSTEM AND COMPUTER PROGRAM PRODUCT FOR FACILITATING THE ANALYSIS OF AUTOMATIC LINE INSULATION TESTING DATA

(75) Inventors: Robert Hollis Wright, Ramsey, IN (US); Dianna Gatson, Louisville, KY (US)

(73) Assignee: AT&T Intellectual Property, I, L.P., Wilmington, DE (US)

( * ) Notice: Subject to any disclaimer, the term of this patent is extended or adjusted under 35 U.S.C. 154(b) by 131 days.

This patent is subject to a terminal disclaimer.

(21) Appl. No.: 11/538,248

(22) Filed: Oct. 3, 2006

(65) Prior Publication Data

US 2007/0174712 A1    Jul. 26, 2007

Related U.S. Application Data

(63) Continuation of application No. 10/610,715, filed on Jun. 30, 2003, now Pat. No. 7,116,759.

(51) Int. Cl.
*H04M 1/24* (2006.01)
*H04M 3/08* (2006.01)
*H04M 3/22* (2006.01)

(52) U.S. Cl. .................. 379/9; 379/1.01; 379/9.04; 379/10.01; 379/14.01; 379/29.01

(58) Field of Classification Search ............ 379/1.01, 379/9–9.04, 10.01, 14–14.01, 15.01, 22, 379/29.01, 29.02, 32.01, 32.02
See application file for complete search history.

(56) References Cited

U.S. PATENT DOCUMENTS

| | | | |
|---|---|---|---|
| 4,581,493 A | 4/1986 | Gazzo et al. |
| 5,790,633 A | 8/1998 | Kinser, Jr. et al. |
| 6,026,145 A | 2/2000 | Bauer et al. |
| 6,453,016 B1 | 9/2002 | Chea, Jr. |
| 6,529,583 B2 | 3/2003 | Creamer et al. |
| 6,577,711 B1 | 6/2003 | Williamson, III et al. |
| 6,987,837 B1 | 1/2006 | Blank et al. |
| 2005/0102580 A1 | 5/2005 | House et al. |

*Primary Examiner*—Binh K Tieu
(74) *Attorney, Agent, or Firm*—Cantor Colburn LLP

(57) ABSTRACT

A method for analyzing automatic line insulation testing (ALIT) data comprising receiving an electronic version of ALIT test results and parsing the ALIT test results to extract error data. The error data is inserted into an ALIT database. A number of exceptions per wire center occurring on a selected summary date is calculated in response to receiving a summary request from a user, and the summary date is transmitted to the user in response to the calculating. User records located in the ALIT database that include a selected wire center and a selected detail date are transmitted to the user in response to receiving from the user a wire center detail request. The ALIT database is updated with repair package information in response to receiving an add repair package request.

25 Claims, 11 Drawing Sheets

FIG. 3

WIRE CENTER ~ 302
MAINTENANCE ANALYST NAME ~ 304
EXCEPTION DATE ~ 306
REPAIR PACKAGE ~ 308
FACILITY NUMBER ~ 310
CABLE ~ 312
PAIR ~ 314
TROUBLE MESSAGE ~ 316
TELEPHONE NUMBER ~ 318
TEA ~ 320
TEST RESULT ~ 322

FIG. 6

| Pkg? | FNum | CABLE | PAIR | TRBL_MESSAGE | TEL NO. | TEA | Test Result |
|---|---|---|---|---|---|---|---|
| BLD PKG | f1 | 13 | 191 | 11:CROSS | 999-2593105 | 1 ped 2 croomsbridge rd | -y 1144 752 2015 watha rd CHANNEL-SINGLE PARTY SERVICE MODEATE BATTERY T-G-8V CROSS TO WORKING PAIR: RING-SIDE AC FEMF CURRENT VERY HARD BATTERY R-G-21 V fef24 |
| BLD PKG | f2 | 1144 | 68 | 11:CROSS | 999-2597396 | p 78 hwy 117 n | -y last 0 last CPE OR HIGH RESISTANCE OPEN VERY HARD BATTERY R-G-22V CHANNEL-SINGLE PARTY SERVICE VERY LIGHT BATTERY T-G-1 V CROSS TO WORKING PAIR: RING-SIDE fef24 |
|  | f2 | 1144 | 71 | 11:CROSS | 999-2594410 | p 78 hwy 117 n | -y last 0 last CHANNEL-SINGLE PARTY SERVICE VERY LIGHT BATTERY T-G-1 V CROSS TO WORKING PAIR:RING-SIDE TONE RINGER DETECTED VERY HARD BATTERY R-G-23 V fef24 |
|  | f2 | 1144 | 72 | 11:CROSS | 999-2592992 | p 81 hwy117 n | -y last 0 last CHANNEL-SINGLE PARTY SERVICE VERY LIGHT BATTERY T-G-1 V CROSS TO WORKING PAIR:RING-SIDE VERY HARD BATTERY R-G-22 V fef24 LEC/MAINT XCABLE XPR XTEA |
|  | f2 | 1144 | 202 | 11:CROSS | 999-2594922 | ped18 watha rd | -y last 0 last CHANNEL-SINGLE PARTY SERVICE VERY LIGHT BATTERY T-G-1 V CROSS TO WORKING PAIR:RING-SIDE VERY HARD BATTERY R-G-22 V fef24 |

FIG. 10

Predictor Reports

Packages built by YRPPXHD

| WC Name | Exception Date | FNum | Cable | LoPr | HiPr | ProAct Package Num |
|---|---|---|---|---|---|---|
| south blvd | 2/7/2003 | f2 | 2244t | 701 | 725 | p30219500 |
| south blvd | 2/7/2003 | f2 | 225sb | 126 | 150 | p30219509 |
| south blvd | 2/7/2003 | f2 | 5525r | 901 | 950 | p30219516 |

FIG. 11

Predictor Reports

Exceptions for SOUTH BLVD 704491 on 2/7/2003 in NC

| FNum | CABLE | PAIR | TRBL MESSAGE | TEL NO. | TEA | Test Result |
|---|---|---|---|---|---|---|
| f1 | 1 | 495 | 14:MARG_CROSS | 999-5273258 | 5525 radford av | -y 5525r 330 r622 knight court CPE OR HIGH RESISTANCE OPEN VERY LIGHT BATTERY T-G-1 V CROSS TO WORKING PAIR:RING-SIDE HARD BATTERY R-G-19 V fef0 |
| f1 | 1 | 500 | 14:MARG_CROSS | 999-5228521 | 5525 radford av | -y 5525r 695 r 5136 queen anne rd CROSS TO WORKING PAIR:RING-SIDE HARD BATTERY R-G-10 V TONE RINGER DETECTED fef2 |
| f1 | 1 | 509 | 18:OP_OUT&CRSS | 999-5272614 | 5525 radford av | -y 5525r 815 r5148 shady grove ln OPEN OUT CABLE TIP-CAP BAL 95% CROSS TO WORKING PAIR:RING-SIDE 500 FT. MAX ERROR IN DIST. HARD BATTERY R-G-14 V DISTANCE FROM CO 16500 FT fef2 |
| f1 | 13 | 133 | 18:OP_OUT&CRSS | 999-6658875 | 3 5525 radford av | -y 5525r 19 r5724 coulee pl OPEN OUT BALANCED-CAP BAL 99% CROSS TO WORKING PAIR:RING-SIDE 500 FT. MAX. ERROR IN DIST. LIGHT BATTERY R-G-5 V DISTANCE FROM CO 18700 FT rc |
| f1 | 13 | 135 | 11:CROSS | 999-5231306 | 5 5525 radford av | -y 5525r 724 r 5124 queen anne rd CROSS TO WORKING PAIR RING-SIDE VERY HARD BATTERY R-G-25 V VERY LIGHT BATTERY T-G-1 V fef1 |
| f1 | 13 | 149 | 11:CROSS | 999-5272135 | 9 5525 radford av | -y 5525r 98 r5620 southampton rd CROSS TO WORKING PAIR: RING-SIDE VERY HARD BATTERY R-G-35 V VERY LIGHT BATTERY T-G-1 V fef0 LEC/MAINT XCABLE XPR XTEA |

310 FNum
312 CABLE
314 PAIR
316 TRBL MESSAGE
318 TEL NO.
320 TEA
322 Test Result 1102
1104

METHOD, SYSTEM AND COMPUTER PROGRAM PRODUCT FOR FACILITATING THE ANALYSIS OF AUTOMATIC LINE INSULATION TESTING DATA

CROSS-REFERENCE TO RELATED APPLICATIONS

This application is a continuation of U.S. patent application Ser. No. 10/610,715 filed Jun. 30, 2003, the contents of which are incorporated by reference herein in their entirety.

BACKGROUND OF THE INVENTION

The present disclosure relates generally to the analysis of automatic line insulation testing data and in particular, to a method of facilitating the retrieval, organization and analysis of automatic line insulation testing data.

A typical regional telephone company central office, or wire center, houses a telephone switch to connect telephone calls between two or more parties. A main distribution frame (MDF) frame includes a row of jumpers to connect the switch wires to cable pairs from outside of the central office. Some cables utilize paper as insulation between the wires in the cable. Air compressors, located in the central office, are utilized to minimize the amount of water in the cables. When a cable gets nicked, the paper inside the cable may get wet and cause a short in the cable. It may be necessary to deploy a technician to fix the cable depending on factors such as the number of shorts in a particular cable. In some cases, such as when there is only one short in the cable, the paper may be dry once the technician gets to the cable to repair it. Sending a technician to repair a problem that was corrected should be avoided and technicians should be sent to repair cables that need technician action. One way to determine if a repair package should be built to send a technician to correct a problem is to have criteria such as: only build a repair package if there are more than three shorts, or crossings, of more than twenty volts in a twenty-five pair complement; and if there is only a two volt cross in a cable pair then do not build a repair package as the paper within the cable will probably be dry once the technician gets there. Any criteria may be used to determine when to build a repair package and the criteria may be varied or modified based on experience (e.g., in general or in a particular geographic location).

Currently, many regional telephone companies utilized an off-the-shelf computer product called Predictor to compile morning reports detailing automatic line insulation testing (ALIT) exceptions. ALIT is performed nightly by equipment that sequentially tests lines in the central office for battery crosses and grounds. The Predictor reports that include the results of all the tests, including good cables and cables with battery crosses and grounds, are sent to a printer. The Predictor report for each state (e.g., Tennessee) requires about one box of paper each night. Each morning maintenance administrators (MAs) analyze the reports and build Predictor patterns so that the technicians in the field may correct the problems identified by the tests. The MAs must sift through a box or more of paper each morning to find the failures, or exceptions, that need to be fixed. This practice may be cumbersome for the MA and because it is manual, may be error prone. Also, it may take all morning for the MA to sort through a particular portion of the Predictor report, with repair packages not being built until the afternoon. In addition, the current process does not produce back-up information for determining what information was presented to the MA when a decision to build a repair package was made.

BRIEF DESCRIPTION OF THE INVENTION

One aspect of the present invention is a method for analyzing automatic line insulation testing (ALIT) data. The method comprises receiving an electronic version of ALIT test results and parsing the ALIT test results to extract error data. The error data is inserted into an ALIT database. The ALIT database includes one record for each exception located in the error data and each record includes one or more of: a wire center attribute, an exception date attribute, a facility number attribute, a cable attribute, a pair attribute, a repair package attribute, a maintenance analyst name attribute, a trouble message attribute, a telephone number attribute, a terminal address (TEA) attribute and a test result attribute. The number of exceptions per wire center occurring on a selected summary date is calculated in response to receiving a summary request from a user. The summary request includes the selected summary date and input to the calculating is the selected summary date and the ALIT database. The number of exceptions per wire center occurring on the summary date is transmitted to the user in response to the calculating. User records located in the ALIT database that include a selected wire center and a selected detail date are transmitted to the user in response to receiving from the user a wire center detail request. The wire center detail request includes the selected wire center and the selected detail date. The ALIT database is updated with repair package information in response to receiving an add repair package request. The add repair package request includes one or more of a wire center, a facility, a cable, an exception date, a repair package number, a low pair and a high pair.

In another aspect, a system for analyzing automatic line insulation testing data comprises a network and a storage device in communication with the network. The storage device includes an ALIT database. The system further comprises a user system in communication with the network and a host system in communication with the network. The host system includes application software to implement a method comprising receiving an electronic version of ALIT test results via the network and parsing the ALIT test results to extract error data. The error data is inserted into an ALIT database. The ALIT database includes one record for each exception located in the error data and each record includes one or more of: a wire center attribute, an exception date attribute, a facility number attribute, a cable attribute, a pair attribute, a repair package attribute, a maintenance analyst name attribute, a trouble message attribute, a telephone number attribute, a TEA attribute and a test result attribute. The number of exceptions per wire center occurring on a selected summary date is calculated in response to receiving a summary request from the user system. The summary request includes the selected summary date and input to the calculating is the selected summary date and the ALIT database. The number of exceptions per wire center occurring on the summary date is transmitted to the user system via the network in response to the calculating. User records located in the ALIT database that include a selected wire center and a selected detail date are transmitted to the user system via the network in response to receiving from the user system a wire center detail request. The wire center detail request includes the selected wire center and the selected detail date. The ALIT database is updated with repair package information in response to receiving an add repair package request via the network. The add repair package request includes one or more of a wire center, a facility, a cable, an exception date, a repair package number, a low pair and a high pair.

In a further aspect, a computer program product for analyzing automatic line insulation testing data comprises a storage medium readable by a processing circuit and storing instructions for execution by the processing circuit for performing a method comprising receiving an electronic version of ALIT test results and parsing the ALIT test results to extract error data. The error data is inserted into an ALIT database. The ALIT database includes one record for each exception located in the error data and each record includes one or more of: a wire center attribute, an exception date attribute, a facility number attribute, a cable attribute, a pair attribute, a repair package attribute, a maintenance analyst name attribute, a trouble message attribute, a telephone number attribute, a TEA attribute and a test result attribute. The number of exceptions per wire center occurring on a selected summary date is calculated in response to receiving a summary request from a user. The summary request includes the selected summary date and input to the calculating is the selected summary date and the ALIT database. The number of exceptions per wire center occurring on the summary date is transmitted to the user in response to the calculating. User records located in the ALIT database that include a selected wire center and a selected detail date are transmitted to the user in response to receiving from the user a wire center detail request. The wire center detail request includes the selected wire center and the selected detail date. The ALIT database is updated with repair package information in response to receiving an add repair package request. The add repair package request includes one or more of a wire center, a facility, a cable, an exception date, a repair package number, a low pair and a high pair.

BRIEF DESCRIPTION OF THE DRAWINGS

Referring to the exemplary drawings wherein like elements are numbered alike in the several FIGURES:

FIG. 3 is an exemplary ALIT database record;

FIG. 6 is an exemplary user interface for viewing a list of all exceptions for the selected wire center;

FIG. 10 is an exemplary user interface for viewing a list of all repair packages built in a selected month by a particular MA; and FIG. 11 is an exemplary user interface for viewing the test data utilized by a MA when the MA decided to build the repair package.

DETAILED DESCRIPTION OF THE INVENTION

A method for analyzing automatic line insulation testing (ALIT) data is presented. The method identifies exceptions that need to be handled without going through the paper report. When an MA gets to work in the morning the ALIT information has already been processed and stored in an ALIT database. In an exemplary embodiment of the present invention, the MA logs on to a computer system and selects a district to be analyzed. The MA then views a list of the exception counts by wire center on the computer screen. The report automatically excludes exceptions that have already been addressed by repair packages. The MA may then select a wire center to drill down to the details of the exceptions for the wire center. The exceptions for each cable are grouped together and are color coded to indicate that the exceptions pertain to the same cable. The MA may then analyze the data and build repair packages. An exemplary embodiment of the present invention allows the MA to analyze ALIT data without having to sift through large volumes of paper and without having to be knowledgeable in database search tools (e.g., SQL).

Figure 1:
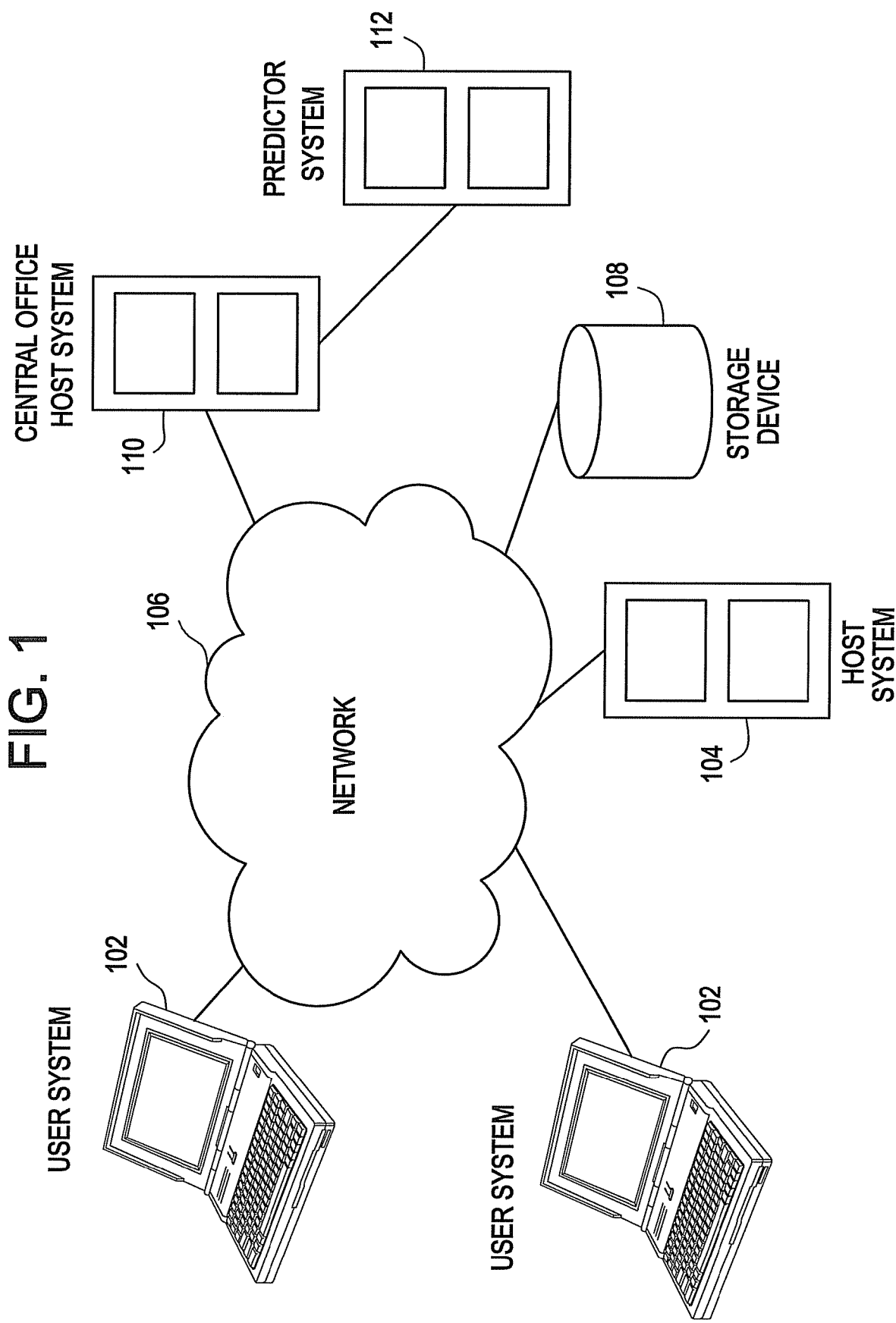
FIG. 1 is a block diagram of an exemplary system for analyzing ALIT data.

In FIG. 1, a block diagram of an exemplary system for facilitating the analysis of ALIT data is generally shown. The exemplary system includes a host system 110 located in a central office operating as an application server. The host system 110 executes a tool called ALIT and dumps the results to a commercially available tool called Predictor, which compiles morning reports detailing ALIT exceptions. The Predictor tool runs on the predictor system 112. ALIT is performed nightly by equipment that sequentially tests lines in the central office for battery crosses and grounds. The Predictor reports that include the results of all the tests, including good cables and cables with battery crosses and grounds are sent to a printer. In an exemplary embodiment of the present invention, the Predictor reports are printed to a virtual printer and the reports are stored in a storage device 108 connected (directly or via a network) to the host system 110.

The system in FIG. 1 also includes one or more user systems 102 through which MAs located at one or more geographic locations may contact the host system 104 to initiate the execution of the ALIT analysis process. In an exemplary embodiment of the present invention, the host system 104 executes the ALIT analysis application program and the user system 102 is coupled to the host system 104 via a network 106. Each user system 102 may be implemented using a general-purpose computer executing a computer program for carrying out the processes described herein. The user system 102 may be a personal computer (e.g., a lap top, a personal digital assistant) or a host attached terminal. If the user system 102 is a personal computer, the processing described herein may be shared by a user system 102 and the host system 104 (e.g., by providing an applet to the user system 102).

The network 106 may be any type of known network including, but not limited to, a wide area network (WAN), a local area network (LAN), a global network (e.g. Internet), a virtual private network (VPN), and an intranet. The network 106 may be implemented using a wireless network or any kind of physical network implementation known in the art. A user system 102 may be coupled to the host system through multiple networks (e.g., intranet and LAN) so that not all user systems 102 are coupled to the host system 104 through the same network. One or more of the user systems 102 and the host system 104 may be connected to the network 106 in a wireless fashion. In an exemplary embodiment, the user system 102 is connected to the host system 104 via an intranet and the host system 104 executes the ALIT analysis application software.

The storage device 108 may be implemented using a variety of devices for storing electronic information. It is understood that the storage device 108 may be implemented using memory contained in the host system 104 or it may be a separate physical device. The storage device 108 is logically addressable as a consolidated data source across a distributed environment that includes a network 106. The physical data may be located in a variety of geographic locations depending on application and access requirements. Information stored in the storage device 108 may be retrieved and manipulated via the host system 104. The storage device 108 includes an ALIT database. The storage device 108 may also include other kinds of data such as information concerning the creation of the ALIT database records (e.g., date and time of creation). In an exemplary embodiment of the present invention, the host system 104 operates as a database server and coordinates access to application data including data stored on storage device 108.

The host system 104 depicted in FIG. 1 may be implemented using one or more servers operating in response to a computer program stored in a storage medium accessible by the server. The host system 104 may operate as a network server (e.g., a web server) to communicate with the user system 102. The host system 104 handles sending and receiving information to and from the user system 102 and can perform associated tasks. The host system 104 may reside behind a firewall to prevent unauthorized access to the host system 104 and enforce any limitations on authorized access. A firewall may be implemented using conventional hardware and/or software as is known in the art.

The host system 104 may also operate as an application server. The host system 104 executes one or more computer programs to facilitate the analysis of ALIT data. One of the computer programs is the ALIT analysis application program. Processing may be shared by the user system 102 and the host system 104 by providing an application (e.g., java applet) to the user system 102. Alternatively, the user system 102 may include a stand-alone software application for performing a portion or all of the processing described herein. As previously described, it is understood that separate servers may be utilized to implement the network server functions and the application server functions. Alternatively, the network server, the firewall, and the application server may be implemented by a single server executing computer programs to perform the requisite functions.

Figure 2:
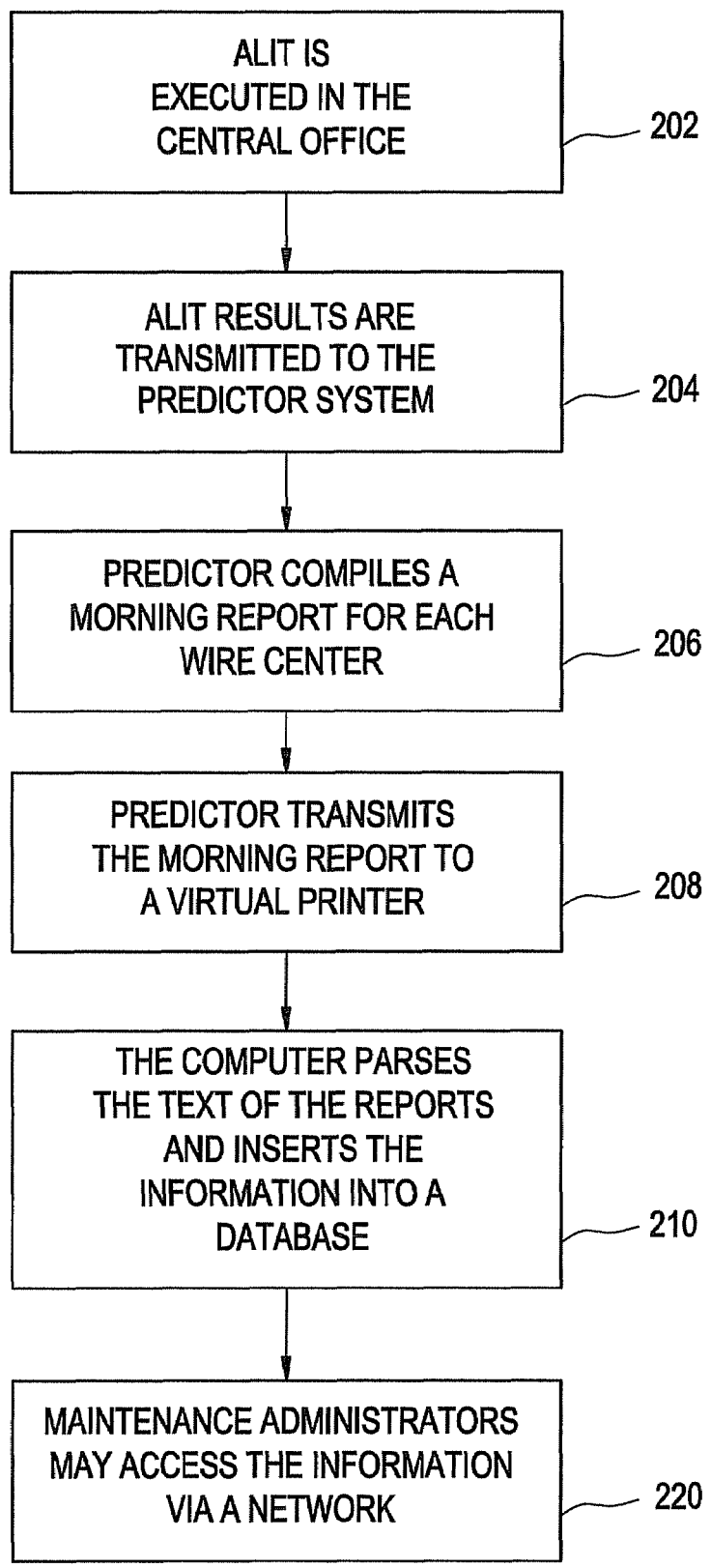
FIG. 2 is flow diagram of an exemplary process for creating an ALIT database for analyzing ALIT data.

FIG. 2 is flow diagram of an exemplary process for creating an ALIT database for analyzing ALIT data. At step 202, the ALIT is executed in the central office. At step 204, the ALIT results are transmitted to the Predictor system 112. The Predictor software compiles a morning report for each wire center at step 206. Next, at step 208, the Predictor software transmits the morning report to a virtual printer 208, located on a storage device 108. In this manner, the Predictor software does not need to be modified to utilize an exemplary embodiment of the present invention because the Predictor software sends output to the storage device 108 in the same manner that it already sends output to a printer. At step 210, the software located on the host system 104 parses the text of the Predictor reports (e.g., extracts only exception records) and inserts the data into an ALIT database located on the storage device 108. Finally, at step 220, the MAs may access the data in the ALIT database via a network.

FIG. 3 is an exemplary ALIT database located on the storage device 108 and created by step 210 in FIG. 2. The database includes an entry, or record, for each exception in the Predictor report. Each entry includes attributes such as: wire center 302; maintenance analyst name 304; exception date 306; repair package 308 (blank if no repair package has been built for the exception and filled in with a repair package number if the MA has built a repair package for the exception); facility number 310; cable 312; pair 314 within the cable; trouble message 316; telephone number 318 affected by the exception; terminal address (TEA) 320; and test result 322. In an exemplary embodiment of the present invention, the ALIT database is a relational database to allow for easy sorting, manipulating and reporting of the ALIT data, however other database management systems may be implemented. Alternate embodiments of the present invention may include a subset of these attributes and/or additional attributes depending on installation requirements. In the exemplary embodiment of the ALIT database depicted in FIG. 3, the attributes are sourced from the Predictor reports. In an alternate embodiment of the present invention, attributes from other sources may be combined with the Predictor report database based on installation requirements.

Figure 4:
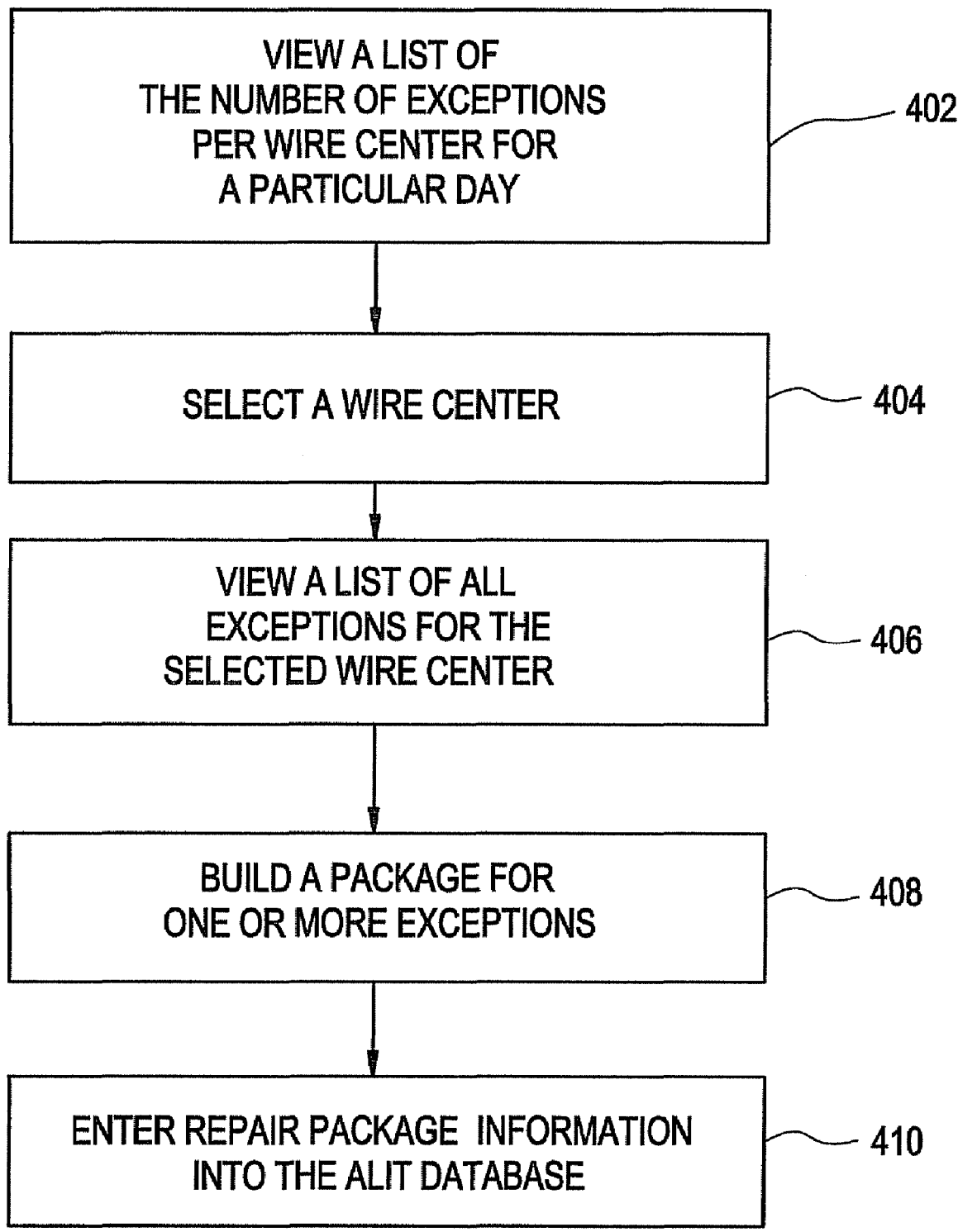
FIG. 4 is a flow diagram of an exemplary process for utilizing an ALIT database for analyzing ALIT data.
Figure 5:
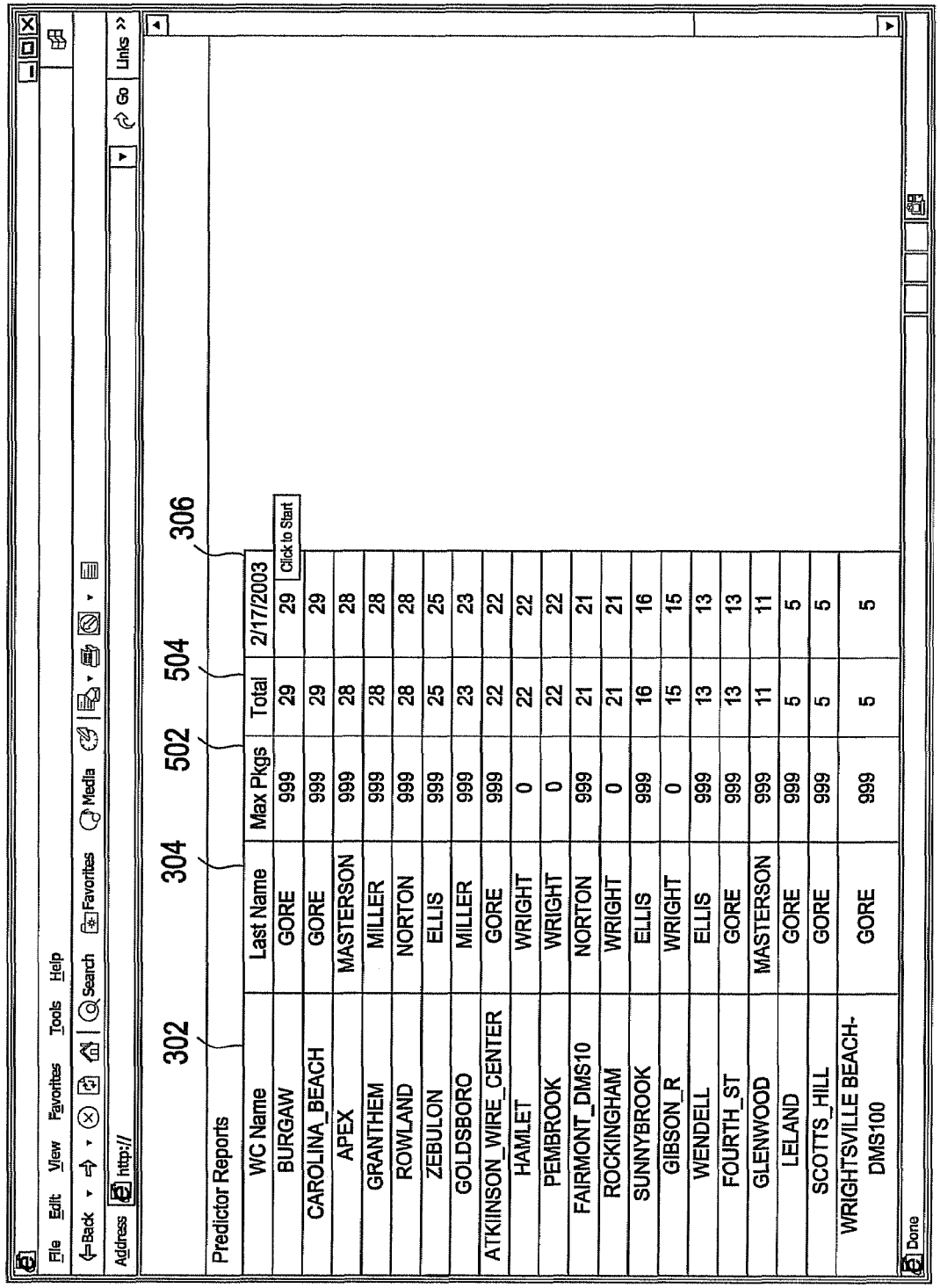
FIG. 5 is an exemplary user interface for viewing a list of the number of exceptions per wire center for a particular day.

FIG. 4 is a flow diagram of an exemplary process that a MA may follow when utilizing an ALIT database for analyzing ALIT data. At step 402 the MA may view a list that includes the number of exceptions per wire center for a particular day. FIG. 5 is an exemplary user interface screen for viewing a list of the number of exceptions per wire center for a particular day. The user interface screen includes a table with one line for each wire center 302. The columns of the table include: wire center 302; maintenance analyst name 304; maximum packages 502 (the field supervisor's estimate at how many packages his team can handle); total number of exceptions 504 in the wire center 302; and exception date 306. With the exception of the maximum packages 502 column, the information in the user interface screen depicted in FIG. 5 is derived by executing a query against the data contained in the ALIT database.

Referring back to FIG. 4, at step 404, the MA may select a wire center 302 from the user interface screen depicted in FIG. 5 by "clicking on" a particular wire center 302 on the screen. At step 406, a list of all the exceptions for the selected wire center is presented to the MA. FIG. 6 is an exemplary user interface for viewing a list of all exceptions for the selected wire center. The user interface screen includes a table with one line for each exception. The columns of the table include: repair package 308; facility number 310; cable 312; pair 314; trouble message 316; telephone number 318; TEA 320 and test result 322. The user interface screen is also color coded and sorted by cable so that a MA may quickly identify which exceptions belong to the same cable. For example, the first line 602 is an exception for cable number thirteen and the second four lines 604 are exceptions for cable number eleven hundred and forty-four.

The table in FIG. 6 does not include exceptions that have already been addressed (e.g., by building a repair package) by the MA so that the MA can focus on those exceptions that may possibly need to be addressed. In an alternate exemplary embodiment, the table depicted in FIG. 6 only includes cables that have three or more exceptions, and/or the table is sorted with the cables having the highest number of exceptions coming first. Any number of sort orders and selection criteria may be utilized with an exemplary embodiment of the present invention to build the screen depicted in FIG. 6. The sort order and selection criteria for the table may be modified (e.g., for the entire system, for a particular wire center, for a particular MA, for a particular day) as required. To build a repair package for one or more exceptions the MA selects, or "clicks on" the repair package 308 column in the table.

Figure 7:
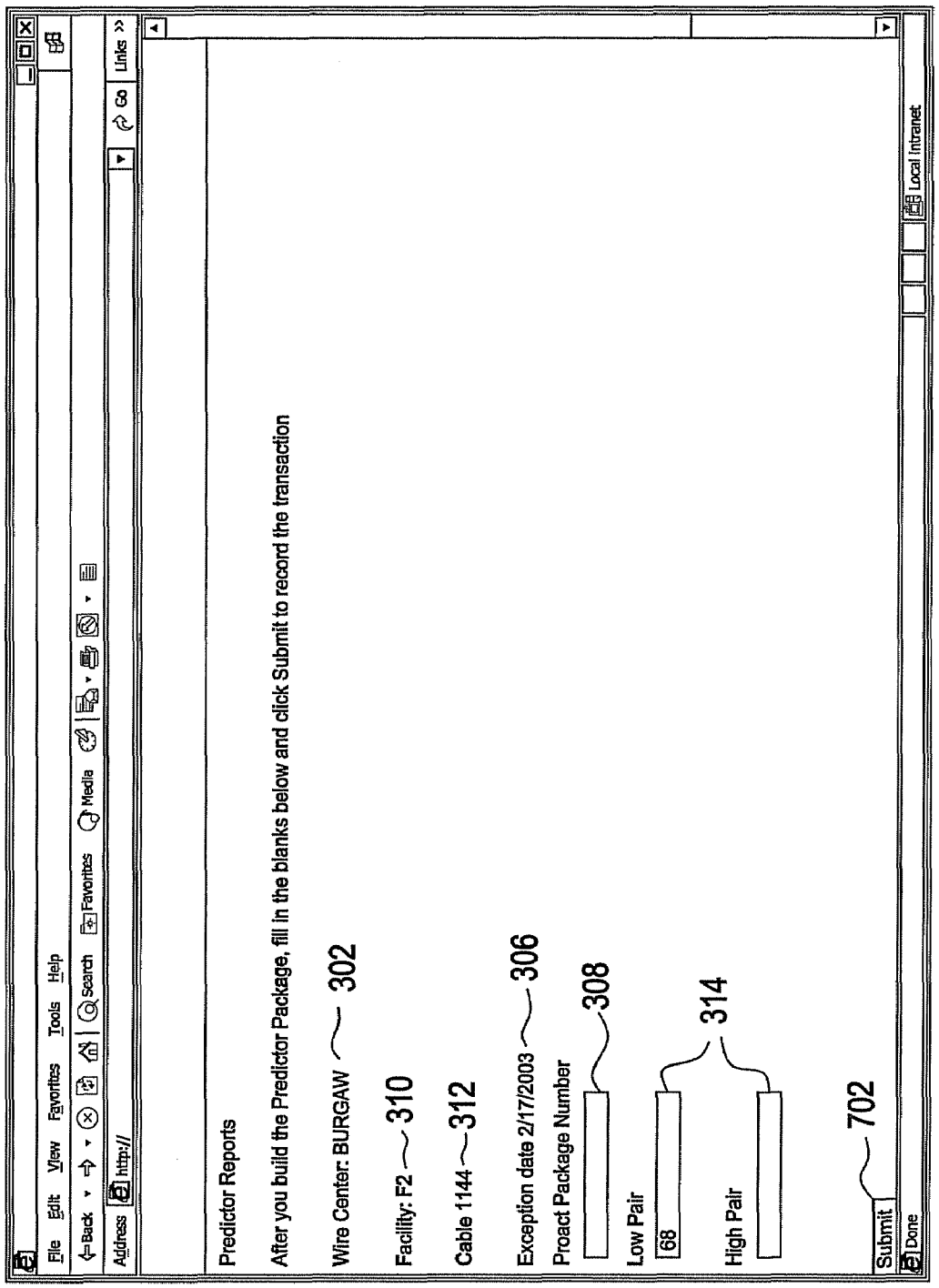
FIG. 7 is an exemplary user interface for entering repair package information into the ALIT database.

Referring back to FIG. 4, a MA may decide to build a repair package that includes one or more exceptions at step 408. The decision to build a repair package may be based on many factors such as the number of failures and/or the severity of failures for a particular cable. In an exemplary embodiment of the present invention, the MA enters a separate system to build a repair package and then returns to the ALIT analysis application program to enter information about the repair package. FIG. 7 is an exemplary user interface for entering repair package information into the ALIT database. The user interface displays the wire center 302, the facility number 310, the cable 312 and the exception date 306. The user is prompted to enter the number associated with the repair package 308, the low pair 314 included in the repair package 308 and the high pair 314 included in the repair package 308. When the MA selects submit 702 the information is added into the ALIT database. In an alternate exemplary embodiment of the present invention, the system that builds the repair package is integrated with the ALIT analysis system to automatically update the ALIT database with the information when a repair package is built. This may be accomplished by having the ALIT analysis system extract information from the system that builds the repair packages or by having the repair package building system sending the information to the ALIT database.

Figure 8:
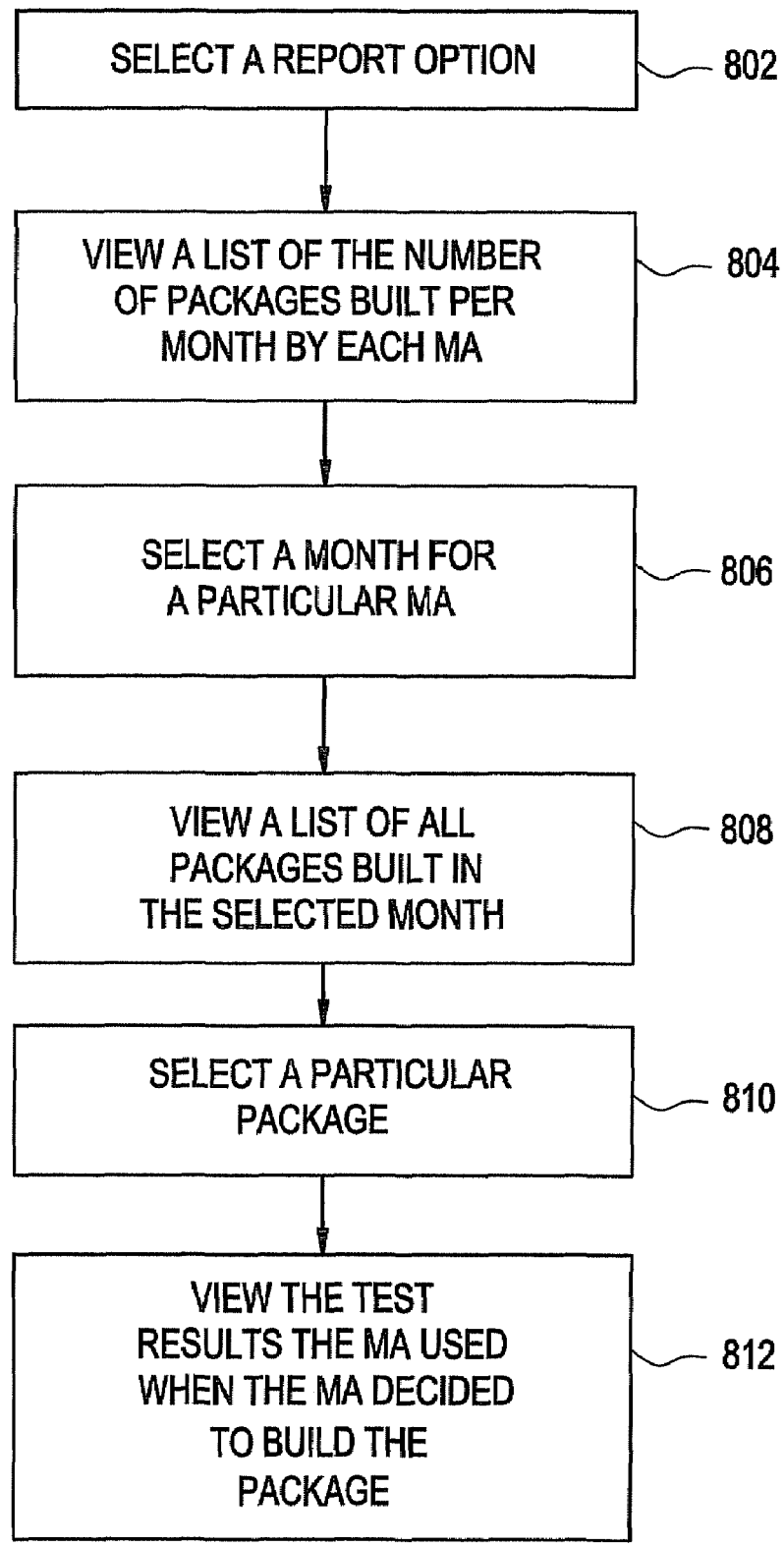
FIG. 8 is a flow diagram of an exemplary process for analyzing the decision process of a MA when a repair package was created.
Figure 9:
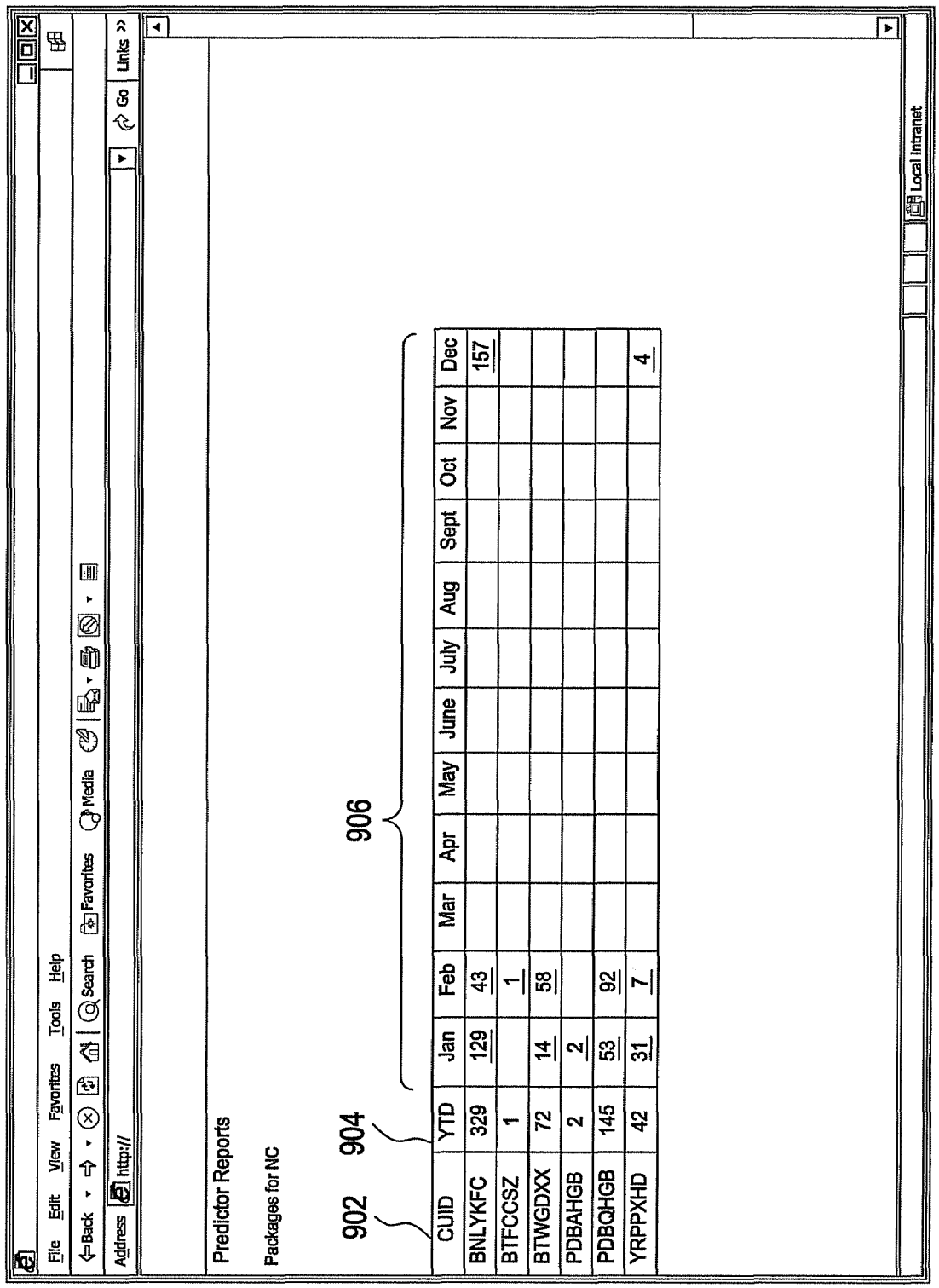
FIG. 9 is an exemplary user interface for viewing a list of the number of repair packages built per month by each MA.

FIG. 8 is a flow diagram of an exemplary process for analyzing the decision process of a maintenance analyst when a repair package was created. This may be useful in refining the decision process used by the MAs to determine when to create a repair package and to track the types of exceptions that actually require a repair package for correction. At step 802, a MA supervisor or MA may select the report option. At step 804, the MA supervisor is presented with a list of the number of repair packages built per month by each MA. FIG. 9 is an exemplary user interface for viewing a list of the number of repair packages built per month by each MA. The user interface screen in FIG. 9 includes a table with one line for each MA. The MA is identified by a common user identification (CUID) 902 which corresponds to the MA name 304. For each CUID 902 a year to date total 904 of all repair packages built as well as the total number of repair packages built on a monthly basis 906 are displayed. The values in these columns may be calculated using data contained in the ALIT database.

Referring back to FIG. 8, at step 806, the MA supervisor selects a month for a particular MA by "clicking on" the month in the user interface screen depicted in FIG. 9. At step 808, the MA supervisor may view a list of all repair packages built in the selected month for the selected MA. FIG. 10 is an exemplary user interface for viewing a list of all repair packages built in a selected month by a particular MA. The MA supervisor is presented with a table that includes one line for each repair package built during the selected month. The columns include wire center 302, exception date 306, facility number 310, cable 312, low pair 314, high pair 314 and repair package 308. Again, the data in these columns is derived from the contents of the ALIT database.

At step 810 in FIG. 8, the MA supervisor may select a particular repair package to understand the criteria utilized by the MA in creating the repair package by "clicking on" the repair package field in FIG. 10. At step 812, the ALIT test results the MA utilized when deciding to build the repair package are displayed. FIG. 11 is an exemplary user interface for viewing the test data utilized by a MA when the MA decided to build the repair package. The user interface screen includes a table with one line for each exception. The columns of the table include: facility number 310; cable 312; pair 314; trouble message 316; telephone number 318; TEA 320 and test result 322. The user interface screen is also color coded and sorted by cable so that a MA supervisor may quickly identify which exceptions belong to the same cable. For example, the first three lines 1102 are exceptions for cable number one and the next three lines 1104 are exceptions for cable number thirteen.

These reports may be utilized by a MA supervisor for evaluation and training of MAs and they could point out the need for modified criteria for building repair packages. These reports are examples of the type of information that may be gleaned from the ALIT database. Other sort orders and content are possible in an alternate exemplary embodiment of the present invention. In addition, the reports may be entered into a spreadsheet package (e.g., Excel) and/or e-mailed to a field technician if there is some question about whether a repair package should have been created. An alternate embodiment of the present invention includes creating a report that shows the status of ALIT in all offices. The report may filter out only those offices that require attention because ALIT has not executed. In this manner a MA may know whether the data in the ALIT database is complete.

An embodiment of the present invention organizes ALIT exception data in an on-line database. This may lead to increased analysis speed because a MA is no longer required to sift through a massive report to identify and group exceptions to build a repair package. In contrast, an embodiment of the present invention groups together exceptions based on exception date and cable so that the MA may easily identify and analyze exceptions. In addition, using an automated on-line database may lead to a decrease in the number of errors in terms of repair packages that weren't built that should have been built and repair packages that were built that didn't need to be built. This may lead to an increased reliance by technicians in the field on the repair packages being built and delivered. Further, the ability to analyze the data that a MA had available on a particular date may lead to improving the repair package building analysis process. An embodiment of the present invention may also lead to a cost savings in terms of the amount of paper that may be saved. Finally, a value may be attached to fixing exceptions more quickly in terms of both MA time savings and customer good will.

As described above, the embodiments of the invention may be embodied in the form of computer-implemented processes and apparatuses for practicing those processes. Embodiments of the invention may also be embodied in the form of computer program code containing instructions embodied in tangible media, such as floppy diskettes, CD-ROMs, hard drives, or any other computer-readable storage medium, wherein, when the computer program code is loaded into and executed by a computer, the computer becomes an apparatus for practicing the invention. An embodiment of the present invention can also be embodied in the form of computer program code, for example, whether stored in a storage medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims. Moreover, the use of the terms first, second, etc. do not denote any order or importance, but rather the terms first, second, etc. are used to distinguish one element from another.

What is claimed is:

1. A method for facilitating the analysis of automatic line insulation testing (ALIT) data, said method comprising:
inserting ALIT error data into an ALIT database, wherein said ALIT database includes records for exceptions located in said error data, said records including one or more of a wire center attribute, an exception date attribute, a facility number attribute, a cable attribute, a pair attribute, a repair package attribute, a maintenance analyst name attribute, a trouble message attribute, a telephone number attribute, a terminal address (TEA) attribute and a test result attribute;
calculating a number of exceptions occurring on a selected summary date in response to receiving a summary request from a user including said selected summary date, wherein input to said calculating is said selected summary date and said ALIT database;
transmitting to said user the number of exceptions occurring on said summary date in response to said calculating;
transmitting to said user records located in said ALIT database that include a selected detail date in response to receiving from said user a request including said selected detail date; and
updating said ALIT database with repair package information in response to receiving an add repair package request, wherein said add repair package request includes one or more of a wire center, a facility, a cable, an exception date, a repair package number, a low pair and a high pair.

2. The method of claim 1 wherein said user transmits said summary request and specifies said selected summary date with one keystroke by selecting said selected summary date on a user screen.

3. The method of claim 1 wherein input to said calculating includes only records from said ALIT database that have not been previously included in a repair package and that contain said selected summary date in said exception data attribute.

4. The method of claim 1 wherein input to said calculating includes only records from said ALIT database that correspond to cables that contain three or more exceptions records on said selected summary date.

5. The method of claim 1 wherein said records located in said ALIT database that include said selected detail date include only those records that have not been previously included in a repair package.

6. The method of claim 1 wherein said records located in said ALIT database that include said selected detail date include only those records corresponding to cables that contain three or more exception records.

7. The method of clam 1 wherein said user specifies said selected detail date with one keystroke by selecting said selected detail date on a user screen.

8. The method of claim 1 wherein said transmitting to said user the number of exceptions occurring on said summary date is via a user screen.

9. The method of claim 1 wherein said transmitting to said user records located in said ALIT database that include a selected detail date is via a user screen.

10. The method of claim 9 wherein said records relating to the same cable are color-coded and grouped together on said user screen.

11. The method of claim 1 wherein said repair package information is received from said user.

12. The method of claim 1 wherein said repair package information is received from an application that creates said repair package.

13. The method of claim 12 wherein said application is Proact.

14. The method of claim 1 further comprising transmitting to said user the number of said repair packages built per month by each maintenance analyst in response to receiving a maintenance analyst summary request.

15. The method of claim 1 further comprising transmitting to said user the repair packages built by a selected maintenance analyst in response to receiving a maintenance analyst detail request including said selected maintenance analyst.

16. The method of claim 1 further comprising transmitting to said user ALIT test results utilized by said maintenance analyst to create said repair package in response to receiving a repair package detail request including said repair package number.

17. The method of claim 1 further comprising transmitting to said user a subset of said ALIT database in response to receiving a user defined query from said user, wherein said subset of said ALIT database is responsive to said user defined query.

18. A system for facilitating the analysis of ALIT data, the system comprising:
a network;
a storage device in communication with said network, wherein said storage device includes an ALIT database;
a user system in communication with said network; and
a host system in communication with said network, said host system including application software to implement a method comprising:
inserting ALIT error data into said ALIT database, wherein said ALIT database includes records for exceptions located in said error data, said records including one or more of a wire center attribute, an exception date attribute, a facility number attribute, a cable attribute, a pair attribute, a repair package attribute, a maintenance analyst name attribute, a trouble message attribute, a telephone number attribute, a TEA attribute and a test result attribute;
calculating a number of exceptions occurring on a selected summary date in response to receiving a summary request via the network from the user system, said summary request including said selected summary date, wherein input to said calculating is said selected summary date and said ALIT database;
transmitting to said user system via the network the number of exceptions occurring on said summary date in response to said calculating;
transmitting to said user system via the network records located in said ALIT database that include a selected detail date in response to receiving from said user system a request including said selected detail date; and
updating said ALIT database with repair package information in response to receiving via said network an add repair package request, wherein said add repair package request includes one or more of a wire center, a facility, a cable, an exception date, a repair package number, a low pair and a high pair.

19. The system of claim 18 wherein said network is the Internet.

20. The system of claim 18 wherein said network in an intranet.

21. The system of claim 18 wherein said ALIT database is a relational database.

22. The system of claim 18 wherein said user system is located in the same geographic location as said host system.

23. The system of claim 22 wherein said user system and said host system communicate directly.

24. The system of claim 18 wherein said user system is located in a different geographic location than said host system.

25. A computer program product for vehicle diagnostic record mapping, the computer program product comprising:
- a storage medium readable by a processing circuit and storing instructions for execution by the processing circuit for performing a method comprising:
    - inserting ALIT error data into an ALIT database, wherein said ALIT database includes records for exceptions located in said error data, said records including one or more of a wire center attribute, an exception date attribute, a facility number attribute, a cable attribute, a pair attribute, a repair package attribute, a maintenance analyst name attribute, a trouble message attribute, a telephone number attribute, a TEA attribute and a test result attribute;
    - calculating a number of exceptions occurring on a selected summary date in response to receiving a summary request from a user including said selected summary date, wherein input to said calculating is said selected summary date and said ALIT database;
    - transmitting to said user the number of exceptions occurring on said summary date in response to said calculating;
    - transmitting to said user records located in said ALIT database that include a selected detail date in response to receiving from said user a request including said selected detail date; and
    - updating said ALIT database with repair package information in response to receiving an add repair package request, wherein said add repair package request includes one or more of a wire center, a facility, a cable, an exception date, a repair package number, a low pair and a high pair.

* * * * *